Sept. 5, 1939.  B. L. PAYSON  2,171,889

BOAT TRAILER APPARATUS

Filed March 2, 1938  2 Sheets-Sheet 1

Inventor

Buford L. Payson

By

Attorney

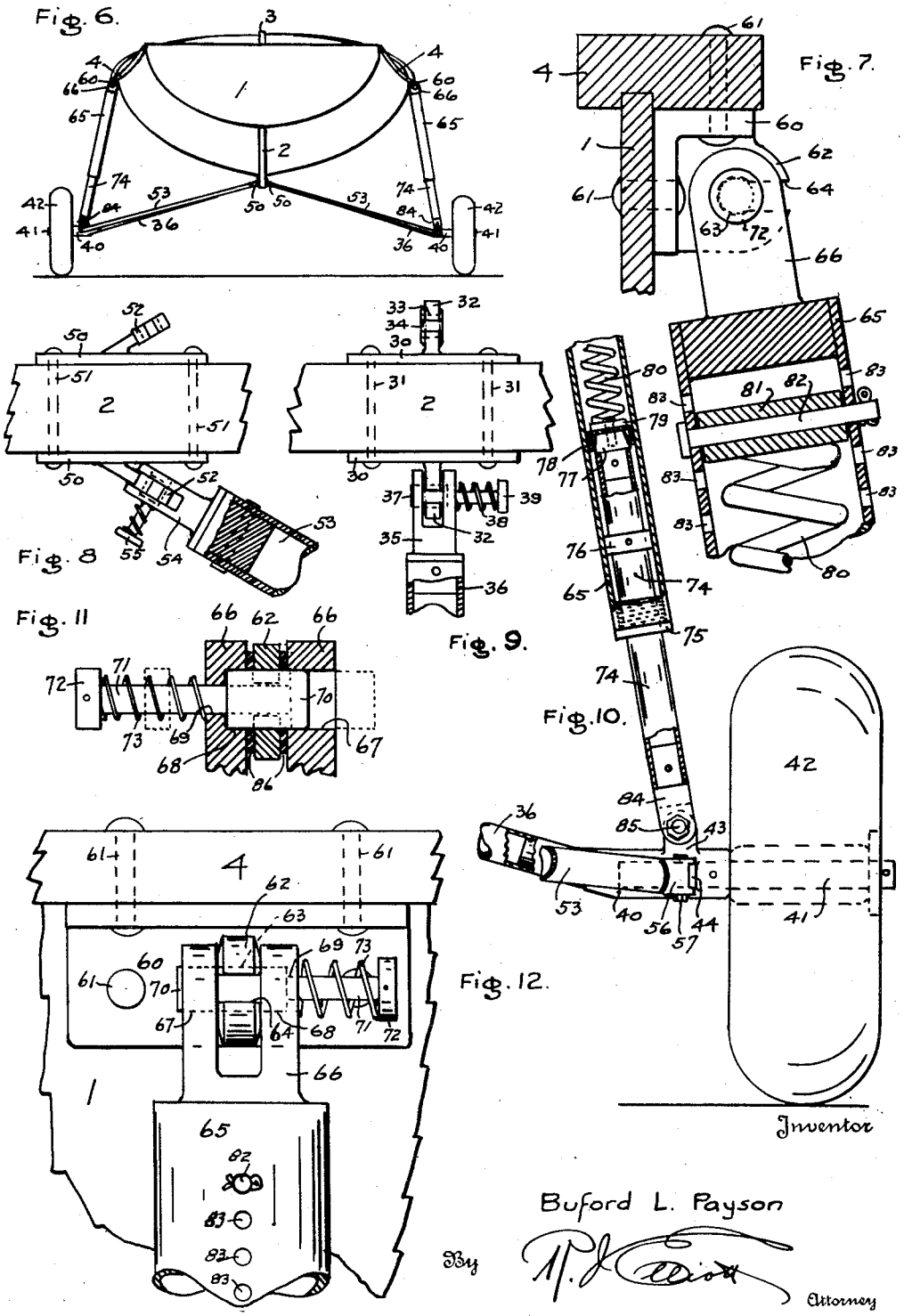

Patented Sept. 5, 1939

2,171,889

UNITED STATES PATENT OFFICE 2,171,889

BOAT TRAILER APPARATUS

Buford L. Payson, Tacoma, Wash.

Application March 2, 1938, Serial No. 193,500

4 Claims. (Cl. 280—80)

My invention relates to means for transporting a boat as a trailer of an automobile, and has for its object to provide such an apparatus as will fold into small area so that it may be stowed away either in the boat or in the automobile, when not in use.

Other objects of my invention are to provide means which, when in use, is firmly attached to the boat and is substantially one structure therewith; second, which may be quickly detached therefrom; third, which, when detached from the automobile, will hold the boat in stable balanced condition; fourth, in which one member of each securing means remains permanently attached to the boat; fifth, in which the towing connection is adjustable to suit the height of the automobile bumper; sixth, in which the connections between the boat and the apparatus are spring-locked in holding position and may be released by moving the locking bolt against the action of said spring; seventh, in which the two bracing members fold on to the axle member when released, to pack into small space; eighth, in which the apparatus supports the boat without substantial strain and in such manner as to cause it to ride with ease over the roughest of roads; and ninth, which is simple to make, easy to install and effective in use.

I attain these and other objects by the devices, mechanisms and arrangements illustrated in the accompanying drawings, in which—

Figure 1:
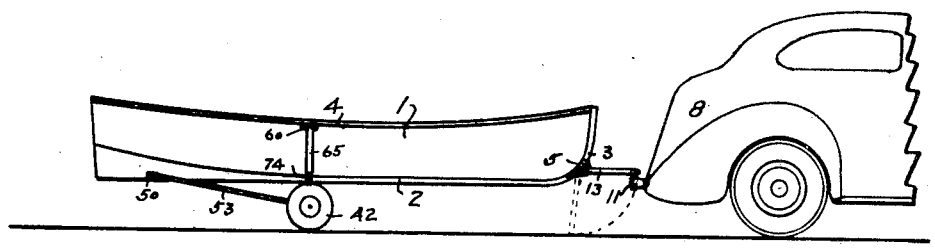
Figure 2:
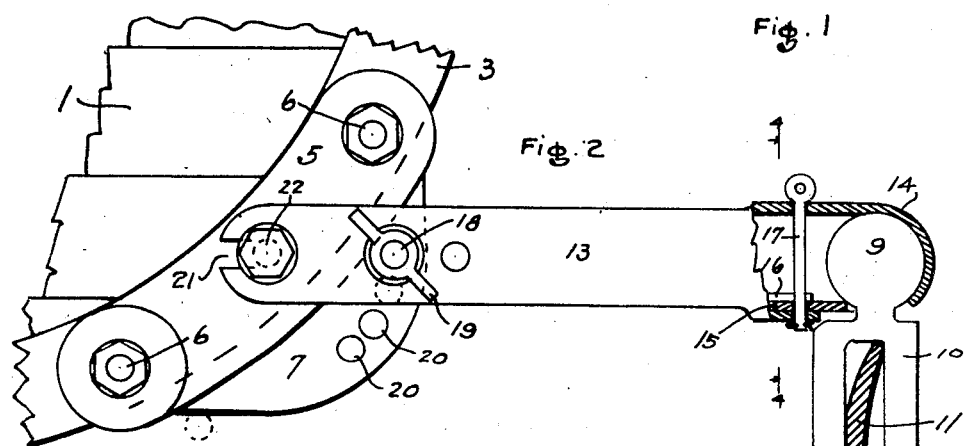
Figure 3:
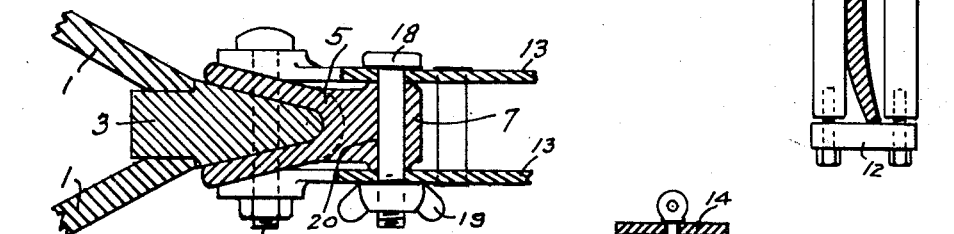
Figure 4:
Figure 5:
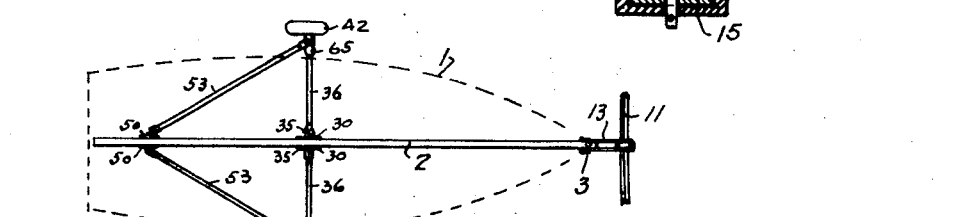

Fig. 1 is a side elevation of my apparatus in use, showing the boat being towed by an automobile; Fig. 2 is a side elevation of the towing attachment; Fig. 3 is a horizontal section thereof; Fig. 4 is a cross-section thereof, taken on the line 4—4 in Fig. 2; Fig. 5 is a plan view of the apparatus, the boat outline being shown in broken lines and the boat keel being shown in full lines; Fig. 6 is a rear view of my apparatus as mounted on a boat; Fig. 7 is a vertical section of the boat gunwale and the connection with the spring brace; Fig. 8 is a bottom plan view of the connection of the diagonal braces with the keel of the boat; Fig. 9 is a similar view of the connection of the axle brace with the keel of the boat; Fig. 10 is a rear elevation, partly in section to reveal the construction, of the wheel with the three braces connected thereto; Fig. 11 is a section showing the releasable lock for the connections to the boat; and Fig. 12 is a side elevation of the connection of the spring brace to the gunwale of the boat.

Similar numerals of reference refer to similar parts throughout the several views.

Referring to the drawings, it will be seen that the boat itself forms the trailer, the dragging stress being transmitted through the keel thereof, and the lower braces being attached to the keel while the side braces are attached to the gunwale.

The boat 1 is provided with a keel 2, stem 3 and rail or gunwale 4, and may be of the usual construction. A casting 5 fits on and is permanently secured to the lower part of the stem 3 by means of bolts or rivets 6 and comprises a V-shaped portion which fits around the stem (Figs. 2 and 3) and a flange or nose 7 extending centrally forward therefrom. The casting 5 is normally not removed from the boat.

The trailer connection on the car 8 comprises a cast ball 9 formed on a tined structure 10 adapted to be secured to the bumper 11 of the automobile 8, by means of a cap 12 engaging the lower edge of the bumper 11 and secured to the said tines 10.

The towing link comprises a casting 13, formed with a head 14 adapted to engage on and around the ball 9 and open at its lower edge to receive the said ball. A holding plate 15 is mounted in suitable guides 16 (Figs. 2 and 4) and is adapted to engage the under side of the ball 9 to keep the link head 14 from slipping upward off the ball. A pin 17 may be used to lock the plate 15 in such holding position. The rear end of the link 13 comprises two side bars adapted to engage the two sides of the casting 5 and the nose 7 (Fig. 3). A bolt 18 with thumbnut 19 passes through the said bars and through one of the several holes 20 in the said nose 7, thus providing a vertical adjustment for the link 13 to allow for various heights of the bumpers 11 of the towing car 8. The rear ends of the bars of the link 13 are provided with slots 21, adapted to fit around a bolt 22 passing through the casting 5.

Thus it will be seen that the boat may be disconnected from the car 8 by removing the pin 17 and moving the plate 15 rearward, thus releasing the link 13 from the ball 9 on the car. In some cases the link 13 may be left on the boat 1 since, with out-board motors, the stem 3 is usually entirely out of the water. By removing the thumbnut 19 and the bolt 18, and loosening the nut of the bolt 22, the link 13 may be swung down, as shown in dotted lines in Fig. 1, to form a leg or brace engaging the ground and holding the bow of the boat from contact with the ground, or the said link 13 may be slid off the said bolt 22, by means of the slot 21, and thus entirely removed from the boat.

The keel 2 extends, of course, rearward from the stem 3 and forms, with the boat structure, the "back-bone" of the trailer apparatus. At a suitable point in the keel 2, preferably rearward of its center of gravity, two similar fittings 30 are permanently secured by bolts or rivets 31 on the two sides of the keel, in corresponding positions. These fittings 30 (Fig. 9) each comprise a plate engaging the keel and a central lug 32, extending laterally and provided with a horizontal-longitudinal hole 33 and a smaller slot 34 extending to the said hole 33. The axle-brace fitting comprises a bifurcated casting 35, secured in the end of the axle-brace 36. This fitting 35 is adapted to embrace the said lug 32 and is provided with a hole corresponding in size and position with the hole 33. The said hole in the tines of the fitting 35 extends entirely through one tine but only part way through the other tine, joining therein with a smaller coaxial hole, said smaller hole being of about the same size as the slot 34 in the lug 32. A horizontal pin 37 is made of two coaxial parts, each of such diameter as to slidably fit the respective holes. A spring 38 is wound around the smaller stem of the pin 37 and engages the head 39 thereof, to hold the pin in normal or locked position therein. The above-described construction is the same as is illustrated in Figs. 7, 11 and 12 in connection with another similar fitting, as hereinafter set forth. In this normal position the larger part of the pin 37 passes through the tines of the fitting 35 and through the hole in the lug 32, thus securely fastening the axle-brace 36 to the keel 2; but if the head 39 is pressed, against the action of the spring 38, then the pin is slid axially until the smaller stem thereof alone passes through the lug 32 and, since the slot 34 in the lug 32 is of the same size, the pin can now pass out of the hole 33, thus releasing the axle-brace 36 from all connection with the boat. The pin 37 does not leave the fitting 35.

The axle-brace 36 is preferably tubular and extends at right-angles to the keel 2, preferably in a slightly downwardly inclined direction, to the terminal casting 40 which is fixedly secured to its outer end. The axle 41 extends outward from the terminal casting 40 and is provided with an appropriate wheel 42, suitably mounted to rotate thereon.

The terminal casting 40 has an upward extending lug 43 and a rearwardly extending lug 44, for the purpose of receiving the ends of the side brace and the diagonal brace as hereinafter set forth. The upward lug 43 is provided with a horizontal fore-and-aft hole therethrough while the rearward lug 44 has a vertical hole therethrough.

At a point near the rear end of the keel 2 a pair of cast fittings 50 are permanently secured on the two sides of the keel by means of bolts or rivets 51. These fittings 50 are constructed similar to the above-described fittings 30 except that the lugs 52 extend in a forward diagonal direction in line with the diagonal brace 53 of the apparatus (Figs. 5 and 8). Similarly, the diagonal brace 53 is provided with a fitting 54 similar to the above-described fitting 35, and adapted to engage and be removably secured to the fitting 50 in a manner as above described, by the horizontal-diagonal pin 55, similar to the horizontal-longitudinal pin 37.

The diagonal brace 53 is tubular and the fitting 54 is fixedly secured to its rearward end. A bifurcated fitting 56 is fixedly secured to the other end of the diagonal brace 53 and is arranged so that its tines are adapted to lie above and below the rearward lug 44 on the terminal casting 40 and to be pinned thereto by a vertical pin or bolt 57.

The gunwale 4 of the boat 1 is provided at a point substantially in the same plane as the above-described fittings 30, with a special fitting 60 (Fig. 7) permanently secured thereto by bolts or rivets 61. This fitting is also provided with a laterally extending lug 62, similar to the above-described lugs 32 and 52, having a hole 63 and a narrower slot 64 therein. The upper end 65 of the side brace is provided with a fitting 66 similar to the above-described fittings 35 and 54 secured thereto and adapted to embrace and be secured to the said gunwale fitting 60 by means of a horizontal pin, similar to the pins 37 and 55. As will be seen in Figs. 7, 11 and 12, one of the tines of the fitting 66 has a hole 67 therethrough, of the same size as the hole 63 in the lug 62, while the other tine has a corresponding hole 68 extending a part way therethrough and connecting with a coaxial hole 69 of smaller diameter and of substantially the same size as the said narrower slot 64. The pin is formed of two parts 70 and 71, each adapted to fit and slide in the said holes 67, 68 and 69. The smaller stem 71 of the pin is provided with a head 72, and with a spring 73 wound around it between the head and the adjacent tine.

The side brace is formed of two tubes 65 and 74, the tube 74 telescoping into the tube 65. The lower end of the larger tube 65 is provided with an internal screwed plug 75 through which the smaller tube 74 passes and is permitted free axial movement therein. A stop 76 is secured to the tube 74 above the said plug 75 to prevent the tube 74 from leaving the tube 65. The upper end of inner tube 74 is provided with a guide 77 made in the form of a truncated cone, outside of which is mounted an inverted leather cup 78, and on top of which is secured a plate 79 against which the lower end of the coiled spring 80 rests. The upper end of this coiled spring 80 bears against the stop 81 (Fig. 7) which is adjustably secured in the upper end of the tube 65 by means of a pin 82 passing through it and any selected pair of a series of holes 83 in the said tube 65, whereby the compression of the spring 80 may be adjusted.

The lower end of the smaller tube 74 is provided with a bifurcated fitting 84, the tines of which embrace the forward and rearward sides of the upper lug 43 on the terminal casting 40 of the axle-brace, and a horizontal-longitudinal bolt 85 joins the said tube 74 to said terminal casting 40. The leather cup 78 tends to retard the rebound action of the spring 80 by compressing air in the space between the two tubes 65 and 74 and between the said cup 78 and the screwed plug 75.

It is to be understood that the several joints between the fittings either on the keel 2, gunwale 4, or terminal casting 40 and the respective braces, may be provided with rubber gaskets 86 (Fig. 10) to permit a slight motion of the brace in relation to the fitting without having to be loose therein and thus any rattle of the parts may be avoided.

Thus it will be seen that my apparatus provides a flexible, resilient, support for a boat. Since the pins of the joints at the keel are horizontal, the boat may move freely vertically, while the compression of the springs within the side braces counteracts such vertical movement; the horizontal-longitudinal pin at the gunwale permits such vertical movement without straining the tubes forming the side braces. Also, the horizontal-longitudinal pin at the lower end of the side braces permit such braces to be folded down on the axle-brace when the apparatus is dismounted from the boat, while the vertical pin of the diagonal brace permits it to be swung forward against the side of said axle-brace, so that the three parts fold together to form a compact bundle.

It is to be understood that many changes and variations may be made in the details of construction of my apparatus without departing from the spirit of my invention as outlined in the appended claims, and that the words and terms used in the specification and claims are chosen for convenience and are to be given as generic a meaning as the art will permit.

Having described my invention, what I claim and desire to secure by Letters Patent, is—

1. In a transport apparatus, the combination with a body having a single central lower, and two upper laterally-spaced, longitudinal parts; a pair of axle-braces, secured to said central lower longitudinal part and extending laterally therefrom; wheels mounted on said axle-braces; a pair of diagonal braces, each secured at one end to said central lower longitudinal part and at the other end to the outer end of said axle-braces; and a pair of side-braces, secured at their upper ends to the laterally-spaced longitudinal parts of said body and at their lower ends to the outer ends of said axle-braces; the connections of said side-braces and said diagonal braces with said axle-braces being hinge connections and the axes of said connections being tangential to said axle-brace, whereby when in knock-down positions said braces may be folded up to lie adjacent to said axle-brace.

2. An apparatus as set forth in claim 1, wherein all said brace connections with said body comprise a flange secured to and extending laterally from said body and having a hole therethrough, and having a slot of smaller width than said hole and extending inward to said hole; together with a bifurcated fitting secured to the end of the respective brace and engaging the sides of said flange; and a horizontal pin passing through said fitting and said hole in the flange, said pin being provided with a smaller stem at one end, whereby when said pin is pushed axially until said smaller stem lies in said hole in the flange, said stem may be passed through said slot to disconnect said fitting from said flange.

3. In a transport apparatus, the combination with a body having a single central lower, and two upper laterally-spaced, longitudinal parts; a pair of supporting wheels; separate lateral braces for each wheel, flexibly secured to said central lower longitudinal part and holding the wheels in fixed lateral relation to the body while permitting relative vertical movement; a telescoping side-brace for each wheel, flexibly secured to the corresponding upper longitudinal part; and resilient means within said telescoping braces and adapted to resiliently support the weight of said boat.

4. An apparatus as set forth in claim 3, together with pneumatic means in said side-braces adapted to permit the free action of said resilient supporting means, but to retard the rebound action thereof alone.

B. L. PAYSON.